(12) United States Patent
Jiao et al.

(10) Patent No.: US 9,405,750 B2
(45) Date of Patent: Aug. 2, 2016

(54) DISCRETE WAVELET TRANSFORM METHOD FOR DOCUMENT STRUCTURE SIMILARITY

(75) Inventors: Li-Mei Jiao, Beijing (CN); Jerry J. Liu, Sunnyvale, CA (US); Hui-Man Hou, Beijing (CN); Cong-Lei Yao, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 128 days.

(21) Appl. No.: 14/347,572

(22) PCT Filed: Oct. 31, 2011

(86) PCT No.: PCT/CN2011/081540
§ 371 (c)(1),
(2), (4) Date: Mar. 26, 2014

(87) PCT Pub. No.: WO2013/063734
PCT Pub. Date: May 10, 2013

(65) Prior Publication Data
US 2014/0236968 A1    Aug. 21, 2014

(51) Int. Cl.
G06F 17/30    (2006.01)
G06F 17/14    (2006.01)
G06F 17/22    (2006.01)

(52) U.S. Cl.
CPC ........ *G06F 17/30011* (2013.01); *G06F 17/148* (2013.01); *G06F 17/2211* (2013.01); *G06F 17/2247* (2013.01); *G06F 17/30864* (2013.01); *G06F 17/30896* (2013.01)

(58) Field of Classification Search
USPC .................. 707/738, 748, 755, 802
See application file for complete search history.

(56) References Cited

U.S. PATENT DOCUMENTS 5,848,193 A  *  12/1998  Garcia ................ G06K 9/52
                                                           382/199
6,070,133 A      5/2000  Brewster et al.
(Continued)

FOREIGN PATENT DOCUMENTS

| CN | 101576903 | 11/2009 |
| CN | 101876995 | 11/2010 |

OTHER PUBLICATIONS

Arnoldo Jose Muller-Molina, Kouichi Hirata, Takeshi Shinohara, "A Tree Distance Function Based on Multi-sets," May 2008, pp. 90-100, Published: ALSIP '08 PAKDD Workshops, Kawasu, Japan.

(Continued)

*Primary Examiner* — Cam-Linh Nguyen
(74) *Attorney, Agent, or Firm* — Brooks, Cameron & Huebsch, PLLC

(57) ABSTRACT

Examples of the present disclosure may include methods, systems, and computer readable media with executable instructions. An example method for determining document structure similarity can include segmenting path sequences (206) of Document Object Model (DOM) trees (120, 462) from a number of web pages (202) into B components (561). Path signals (210) corresponding to the path sequences (206) are determined based on a count of the occurrences of particular paths in the B$^{the}$ component (571), and unique path signals (210) are transformed into discrete wavelet signals (214)(572). The discrete wavelet signals (214) are analyzed at multiple DOM tree resolution levels (573).

14 Claims, 5 Drawing Sheets

(56) References Cited

U.S. PATENT DOCUMENTS

| | | | |
|---|---|---|---|
| 7,106,903 B2 | 9/2006 | Chang et al. | |
| 7,562,088 B2 | 7/2009 | Daga et al. | |
| 7,783,614 B2* | 8/2010 | Jones | G06F 17/2229 707/694 |
| 7,783,642 B1* | 8/2010 | Feng | G06F 17/30896 706/55 |
| 7,853,871 B2* | 12/2010 | Simons | G06F 17/30905 715/238 |
| 7,861,151 B2* | 12/2010 | Milic-Frayling | G06F 17/30882 715/200 |
| 7,877,677 B2* | 1/2011 | Wyler | H04L 67/42 715/209 |
| 7,913,163 B1* | 3/2011 | Zunger | G06F 17/30864 715/234 |
| 7,917,755 B1* | 3/2011 | Giliyaru | G06F 17/2211 382/181 |
| 7,954,053 B2* | 5/2011 | Orelind | G06F 17/30899 707/811 |
| 7,970,853 B2* | 6/2011 | Simpson | B42D 25/29 709/217 |
| 7,974,934 B2* | 7/2011 | Ravikumar | G06F 17/30905 706/12 |
| 7,987,417 B2* | 7/2011 | Chakrabarti | G06F 17/30864 715/205 |
| 2001/0016066 A1* | 8/2001 | Amonou | G06T 7/0081 382/173 |
| 2002/0023113 A1* | 2/2002 | Hsing | G06F 17/30578 715/234 |
| 2002/0112082 A1* | 8/2002 | Ko | G06F 17/30899 709/246 |
| 2004/0249979 A1* | 12/2004 | Yamaguchi | H04N 1/00291 709/246 |
| 2005/0021512 A1* | 1/2005 | Koenig | G06Q 50/22 |
| 2005/0038635 A1* | 2/2005 | Klefenz | G10H 3/125 702/189 |
| 2005/0169529 A1* | 8/2005 | Owechko | G06K 9/6254 382/190 |
| 2006/0167784 A1* | 7/2006 | Hoffberg | G06Q 20/401 705/37 |
| 2007/0087756 A1* | 4/2007 | Hoffberg | G06Q 10/0631 455/450 |
| 2009/0006365 A1 | 1/2009 | Liu et al. | |
| 2009/0210407 A1* | 8/2009 | Freire | G06F 17/30864 |
| 2010/0317420 A1* | 12/2010 | Hoffberg | G06Q 30/0207 463/1 |
| 2011/0145249 A1* | 6/2011 | Joshi | G06F 17/30911 707/738 |
| 2012/0215523 A1* | 8/2012 | Inagaki | G06F 17/30705 704/9 |

OTHER PUBLICATIONS

David Buttler, "A Short Survey of Document Structure Similarity Algorithms," Jun. 2004, 7 pages, 5th International conference on Internet Computing, Las Vegas, Nevada, USA.

Deepayan Chakrabarti, Rupesh R. Mehta, "The Paths More Taken: Matching DOM Trees to Search Logs for Accurate Webpage Clustering," WWW 2010, Apr. 2010, pp. 211-220, Santa Clara, California, USA.

Esko Ukkonen, "Approximate string-matching with q-grams and maximal matches," Jan. 1992, pp. 191-211, Theoretical Computer Science, Helsinki, Finland.

Jer Lang Hong, Eugene Stew, Simon Egerton, "DTM-Extracting Data Records from Search Engine Results Page using Tree Matching Algorithm," Dec. 2009, pp. 149-154, International Conference of Soft Computign and Pattern Recognition, Darul Ehsan, Malaysia.

Laf Park, et al., "A Novel Document Retrieval Method Using the Discrete Wavelet Transform," Jul. 2005, pp. 267-298, vol. 23, No. 3, ACM Transactions on Information Systems.

Nikolas Augsten, Michael Bohlen, Johann Gamper, "Approximate Matching of Hierarchical Data Using pq-Grams," Proceedings of the 31st VLDB Conference pp. 301-312, Aug. 2005, Trondheim, Norway.

Philip Bille, "A Survey on Tree Edit Distance and Related Problems," Jun. 2005, pp. 217-239, vol. 337, Issues 1-3, Published: Theoretical Computer Science, Copenhagen, NV, Denmark.

Rui Yang, Panos Kalnis, Anthony K.H. Tung, "Similarity Evaluation on Tree-structured Data," Article, Jun. 2005, pp. 754-755, Proceedings of the ACM SIGMOD International Conference on Management of Data, Singapore.

SG Mallat, "A Wavelet Tour of Signal Processing," Oct. 1999, pp. 183-189, 2nd Edition Academic Pess, San Diego, California, USA.

Unknown, "Haar Wavelet," Retrieved Oct. 10, 2011 from: http://en.wikipedia.org/wiki/Haar_wavelet, 5 pages.

Wuu Yang, "Identifying Syntactic Differences Between Two Programs," Jul. 1991 pp. 739-755, 1 vol. 21, No. 7, Software-Practice and Experience, USA.

Xiaohong Wang, Aaron Smalter, Jun Huan, Gerald H. Lushington, "G-Hash: Towards Fast Kemal-Based Similarity Search in Large Graph Databases," Apr. 2010, 17 pages, USA.

* cited by examiner

DISCRETE WAVELET TRANSFORM METHOD FOR DOCUMENT STRUCTURE SIMILARITY

BACKGROUND

Networks can provide communication paths to access a plurality of electronic information. One example of such a network is the Internet, which can provide communication paths to access a plurality of web sites. The web sites can be formed of a number of individual web pages that are linked together. With the proliferation of web pages, determining the similarity of various web pages can be useful. Similar web pages can include identical web pages, and may include some web pages that are non-identical. Determining identical web pages can be a straight forward process. Determining whether non-identical web pages are similar can be more challenging.

DETAILED DESCRIPTION

Examples of the present disclosure may include methods, systems, and computer readable media with executable instructions, and/or logic. According to one or more examples of the present disclosure, an example method for determining document structure similarity can include segmenting path sequences of Document Object Model (DOM) trees from a number of web pages into B components. Path signals corresponding to the path sequences are determined based on a count of the occurrences of particular paths in the $B^{th}$ component, and unique path signals are transformed into discrete wavelet signals. The discrete wavelet signals are analyzed at multiple DOM tree resolution levels.

As used herein, the term "includes" means includes but not limited to, the term "including" means including but not limited to. The term "based on" means based at least in part on. The term "document," as used herein, includes but not limited to, electronic files such as web pages and word processing files, among others.

This disclosure provides one or more systems and methods for determining document structure similarity using discrete wavelet transformation. Determining document structure similarity using discrete wavelet transformation according to examples of the present disclosure can be utilized as an auxiliary mechanism to a pool of web pages (represented as a tree structured data) to rapidly locate particular DOM trees given a particular web page. The systems and methods described herein for determining similarity can not only achieve high precision, but also can result in increased computing speed.

According to examples of the present disclosure, such systems and methods can determine similarity based on a whether documents, such as web pages, are approximately equivalent. Similar web pages need not be completely identical to be similar. Instead web pages may be identical in part, or possess certain characteristics of interest that are alike. According to some examples of the present disclosure, a measure of similarity can be determined. According to various examples, the measure of similarity can be a numerical value, such as a difference of numerical values computed for each document. According to certain examples, the measure of similarity can be a binary indication of one or more characteristics of the document structures matching or not matching. Determining similarity between two documents, including determining document structure similarity, can be most useful where the determination can be made in real time. Thus, speed in determining document structure similarity can be advantageous. To that end, computational efficiency can be adjusted commensurate with the precision of the similarity determination.

Figure 1:
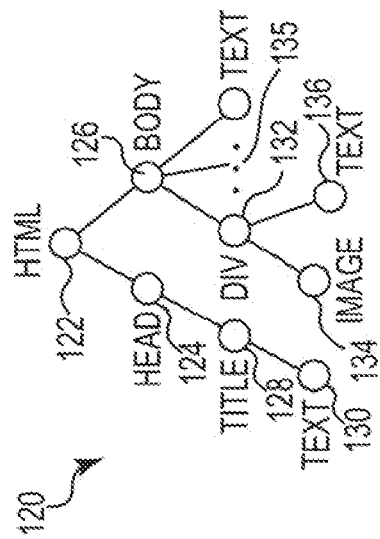
FIG. 1 illustrates a Document Object Model (DOM) tree in accordance with one or more examples of the present disclosure.

FIG. 1 illustrates a Document Object Model (DOM) tree in accordance with one or more examples of the present disclosure. A document can include content and structure information. The document structure information may define how the document is arranged and/or specify various characteristics for portions of the document (e.g., format, font, features, functions, etc.). For example, some documents, such as a web page, can have its structure defined by HyperText Markup Language (HTML). The structure of a document, such as an HTML document, can be represented as a DOM tree, such as the DOM tree 120 shown in FIG. 1. While FIG. 1 illustrates the various paths of a DOM tree 120 graphically, information describing the various paths of a DOM tree can be represented numerically, such as in a matrix. A DOM tree can be a standard model for any structured document.

The DOM is a cross-platform and language-independent convention for representing and interacting with objects in various programming languages, such as HTML, eXtensible Hyper Text Markup Language (XHTML), and eXtensible Markup Language (XML) documents, among others. Aspects of the DOM, such as its elements, may be addressed and manipulated within the syntax of the programming language being used. The public interface of a DOM can be specified in its Application Programming Interface (API).

An HTML page can be rendered in a browser, for example. Web browsers rely on layout engines to parse HTML into a DOM. The browser assembles all the objects that are contained in the HTML page and downloaded from a web-server in its memory. Once completed, the browser then renders these objects in the browser window. The HTML objects, which belong within the DOM, can have descending relationship with each other. The topmost object in the DOM can specify the navigator (i.e., browser) itself, for example. The next level in the DOM can specify the browser's window, and the next level can specify the particular electronic information displayed in the browser's window, for example.

FIG. 1 shows an example DOM tree 120 for a web page structure define using HTML. A DOM tree can be specified and/or illustrated by a number of nodes connected by a number of edges. The DOM tree 120 includes a root node 122, indicated in FIG. 1 as being an HTML node. Along one path originating from the root node 122, the root node 122 is connected to a head node 124, which in turn is connected to a title node 128, which is connected to text node 130, which is a leaf node. A plurality of nodes, from the root node to a particular leaf node, is a path. For example, one path of DOM tree 120 is /html/head/title/text, and another path is /html/body/div/text. A group of continuous paths can be a path sequence. That is a number of paths from the root node to one or more leaf nodes can be a path sequence. For example, the various paths of DOM tree 120 collectively are a path sequence.

A particular DOM tree, such as DOM tree 120, can have many paths that share portions of a path with other paths. For example, DOM tree 120 has several additional paths such as the path starting at HTML node 122 through body node 126 and division node 132 to image node 134. DOM tree 120 further has a path starting at HTML node 122 through body node 126 and division node 132 to text node 136. These two example paths differ only in their respective leaf nodes (e.g., image node 134 versus text node 136) but are otherwise share a portion of each path that includes the HTML node 122, body node 126, and division node 132. DOM tree 120 can have additional paths from HTML node 122 through body node 226 that are not shown in FIG. 1, as indicated in FIG. 1 at 235, in addition to the path to the text leaf node at the far right of DOM tree 120. The methods of the present disclosure can be applied to tree structure different from the example DOM tree 120 shown in FIG. 1.

One method for determining whether two documents are similar can be to determine if their respective corresponding DOM trees are identical. Tree matching methods can be used for comparing DOM trees for similarity in web page clustering and web wrapper induction. Among them, tree edit distance (TED) and simple tree matching (STM) are two previous approaches. These previous approaches are both full tree matching methodologies. That is, each of these previous approaches attempt to determine whether trees are identical. They can be accurate but can also be computationally intensive since determining identical trees can involve evaluation of each node and edge.

Previous approaches, such as a space vector model (e.g., cosine distance, Euclidean distance), toward matching approximations may take into account a number of times a portion of a tree (e.g., DOM tree) appears in the trees being compared, with positional information being disregarded. Disregarding positional information can render such previous approaches un-sensitive to structural differences. Such previous approaches can produce inaccurate results for at least the reason that a same quantity of tree branches can be arranged in multiple ways to produce different tree structures. Ignoring positional information, therefore, introduces errors that cannot be detected from only branch portion occurrence analysis. Therefore, such previous approaches may not be well suited for DOM tree similarity detection applications.

Figure 2:
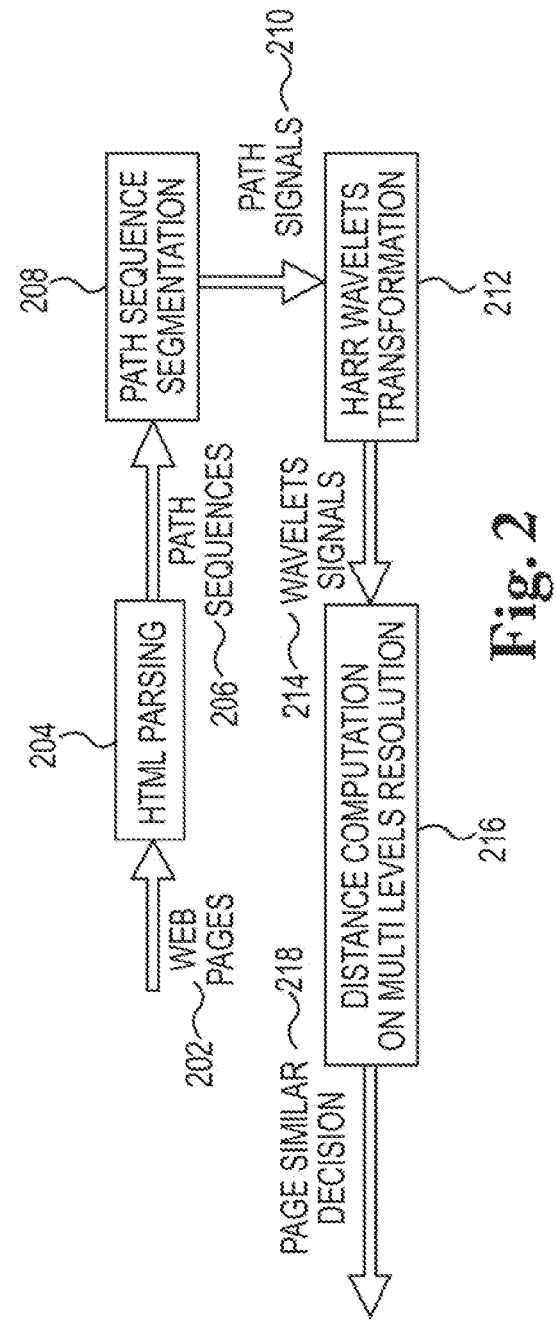
FIG. 2 illustrates a computing system for determining document structure similarity using discrete wavelet transformation in accordance with one or more examples of the present disclosure.

FIG. 2 illustrates a computing system for determining document structure similarity using discrete wavelet transformation in accordance with one or more examples of the present disclosure. At a high level, the system of the present disclosure begins with the two web pages 202 to be compared as input. The output can be a page similar decision 218, such as a logical and/or numerical value to indicate whether the web pages are similar or not. The computing system shown in FIG. 2 can include an HTML parser 204 to parse document object model (DOM) trees from a number of web pages into path sequences. The HTML parser 204 can receive, for example, two web pages 202 being compared for similarity as inputs, and output various path sequences 106 comprising a corresponding DOM tree associated with each web page.

The computing system shown in FIG. 2 can also include a path sequence segmentation module 208 to segment the path sequences into B equal components, and determine path signals corresponding to the path sequences based on a count of the occurrences of particular path sequences in the $B^{th}$ component. The path sequence segmentation module 208 can receive as inputs, the path sequences 206 from the HTML parser 204, and output path signals 210. A Harr wavelet transformation module 212 can receive the path signals 210, transforming unique path signals into discrete wavelet signals 214, for example. An analyzer 216 can receive the wavelet signals 214 and compute a cumulative distance value of the discrete wavelet signals at multiple DOM tree resolution levels, from which a page similar decision 218 can be output.

Figure 6:
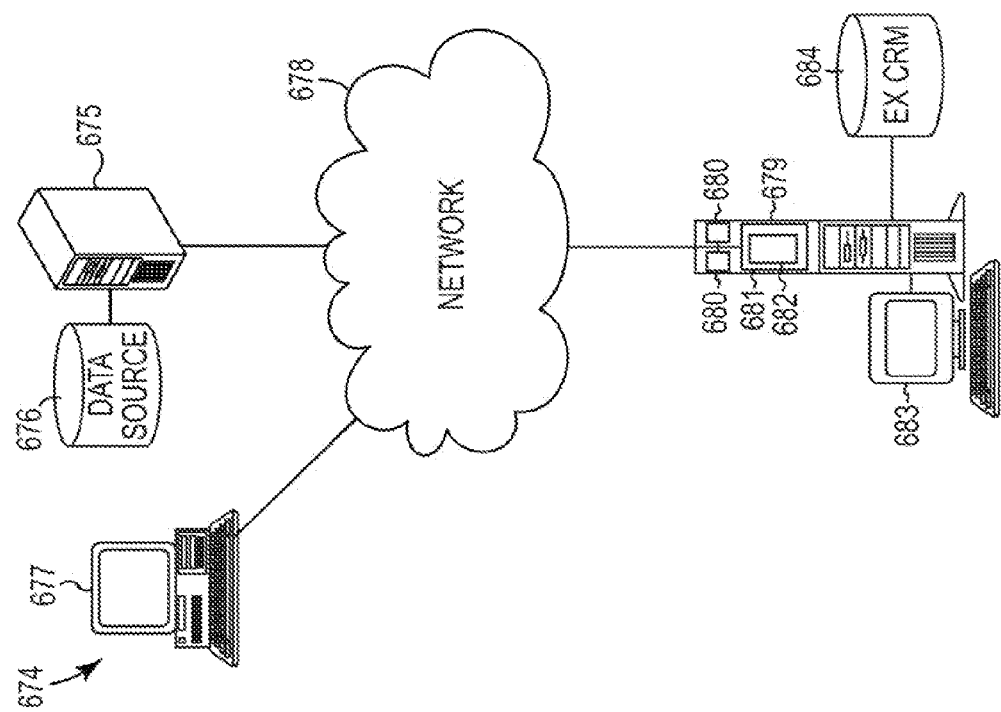
FIG. 6 illustrates a block diagram of an example computing system for determining document structure similarity using discrete wavelet transformation in accordance with one or more examples of the present disclosure.

The computing system shown in FIG. 2 can be a computing system such as is discussed further with respect to FIG. 6. With respect to the components of the computing system shown in FIG. 2, each of the HTML parser 204, path sequence segmentation module 208, Harr wavelet transformation module 212, and/or analyzer 216 can be individual apparatuses, such as a computing device including a processor coupled to a non-transitory computer-readable medium having computer-readable instructions stored thereon. The processor can execute the computer-readable instructions to perform the respective function. The components of the computing system shown in FIG. 2 can also be logical modules, which may be implemented by hardware and/or embodied on computer readable medium, for example, and executed by a common processor.

The HTML parser 204 shown in FIG. 2 can, for each web page, parse the HTML defining a respective web page, thereby converting the respective web page into a DOM Tree. The HTML parser 204 can further convert the resulting DOM tree into a sequence of paths (i.e., path sequences). For example, the DOM tree shown in FIG. 1 can be converted into path sequences T=[html/head/title/text, html/body/div/image, . . . , html/body/text]. For convenience and faster processing, the sequence paths may be converted into numbers (e.g., hexadecimal values) with a hashing function. As an example, the sequence paths may be represented in this manner as T=[10AE, 13E1, . . . , 2F1E]. The numerically-represented sequence paths may be more easily manipulated further by digital processing resources.

Figure 3:
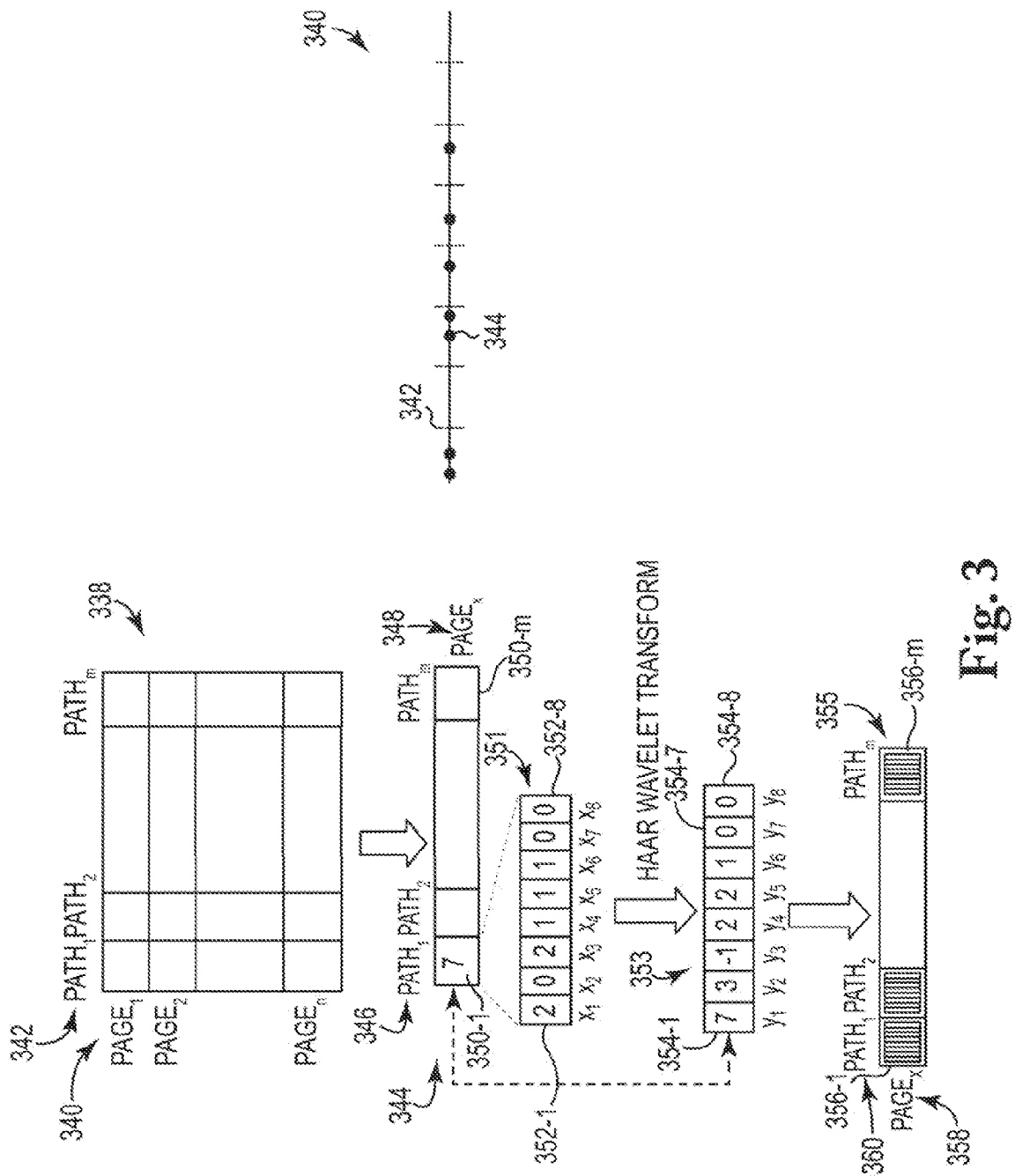
FIG. 3 illustrates a method for determining document structure similarity using discrete wavelet transformation in accordance with one or more examples of the present disclosure.

The various components of the computing system shown in FIG. 2 are discussed in more detail in conjunction with FIG. 3. FIG. 3 illustrates a method for determining document structure similarity using discrete wavelet transformation in accordance with one or more examples of the present disclosure. More particularly FIG. 3 illustrates an example of how the path signals can be obtained.

The path sequences, from the HTML parser 204 shown in FIG. 2, for a number of web pages can be summarized in a path-page matrix 338, such as is shown in FIG. 3. The number of web pages can be, for example, a web page collection, associated with one or more web sites. Path-page matrix 338 can include a number of rows corresponding to web pages 340 (e.g., Page$_1$, Page$_2$, ..., Page$_n$) and a number of columns corresponding to a distinct path 342 (e.g., Path$_1$, Path$_2$, ..., Path$_m$). The path-page matrix 338 can indicate how many times the various paths occur within a DOM tree corresponding to a particular web page. The value for a particular path (e.g., Path$_1$, Path$_2$, ..., Path$_m$) entered in the path-page matrix 338 can also indicate which of the various paths occur, and which paths do not occur, within a DOM tree corresponding to the particular web page.

A particular row of matrix 338 can correspond to a particular web page. For example, a row 344 of path-page matrix 338 corresponding to web page X is shown extracted from the path-page matrix 338 in FIG. 3. Row 344 can include a number of entries that numerically summarize the characteristics of each unique path 346 (e.g., Path$_1$, Path$_2$, ..., Path$_m$) of a path sequence for a particular web page 348 (e.g., web page X). Each of the number of entries in row 344 can correspond to a unique path 346 (e.g., Path$_1$, Path$_2$, ..., Path$_m$). For example, first entry 350-1 corresponds to Path$_1$, and so on, through the m$^{th}$ entry 350-m, which corresponds to Path$_m$.

The path sequence segmentation module 208 shown in FIG. 2 can divide a path sequence 351 into B (e.g., 8) equal components, as shown in FIG. 3. Each path sequence can be converted to a path signal by counting the occurrences of a particular path p in the B$^{th}$ component. For example, the first component 352-1 shown in FIG. 3 reflects that path p occurs 2 times in the first component. As is further shown, path p occurs 0 times in the second component (e.g., X$_2$), 2 times in the third component (e.g., X$_3$), 1 times in each of the fourth, fifth and sixth components (e.g., X$_4$, X$_5$, and X$_6$), 0 times in the seventh component (e.g., X$_7$), and 0 times in the eighth component 352-8 (e.g., X$_8$). The cumulative quantity of occurrences (e.g., 2+0+2+1+1+1+0+0=7) for the B equal components of a path sequence can be entered path-page matrix 338 for the entry 350-1 corresponding to Path$_1$ of Page$_x$, as shown.

The characteristics for the path sequence Path$_1$ of Page$_x$ are also shown graphically in FIG. 3 by graph 340. Graph 340 represents the path sequence, and is divided into 8 equal components, with divisions 342 defining the various components along graph 340. The dots 344 show the position of the path p in the path sequence. For example, path p occurs twice in the first component (e.g., left-most portion) of graph 340. Again, the signal of path p (i.e., signal path) is f$_{p,t}$=[2 0 2 1 1 1 0 0], as indicated by the quantity and placement of dots along graph 340.

According to some examples of the present disclosure, weighting schemes can be used in arriving at a signal path from a path sequence, based on the properties of a certain tree and path. However, for the example discussed here, such weighting schemes are not implemented.

The Harr wavelet transformation module 212 shown in FIG. 2 can function to transform unique path signals into discrete wavelet signals, such as Haar wavelet signals. Each path signal undergoes a discrete wavelet transform, which transforms the path signal into a wavelet signal. For example, the discrete wavelet transform can be a Haar wavelet transform. The Haar wavelet is a single cycle of the square wave having a period of 1. Haar wavelet analysis is similar to Fourier analysis in that it allows a target function over an interval to be represented in terms of an orthonormal function basis. The Haar wavelet's mother wavelet function ψ(t) can be described as:

$$\psi(t) = \begin{cases} 1 & 0 \le t < 1/2, \\ -1 & 1/2 \le t < 1, \\ 0 & \text{otherwise.} \end{cases}$$

Its scaling function ϕ(t) can be described as:

$$\phi(t) = \begin{cases} 1 & 0 \le t < 1, \\ 0 & \text{otherwise.} \end{cases}$$

The wavelet components allow the path signal to be analyzed at multiple tree resolution levels.

The result of the Haar wavelet transform of path sequence 351 is shown in FIG. 3 by Haar wavelet signal vector 353. The transformed Haar wavelet signal vector 353 includes B (e.g., 8) components, corresponding to the B components of path sequence 351. The B (e.g., 8) components of the transformed Haar wavelet signal vector are y1, ..., y8. For this example, and as indicated in FIG. 3, the 8 components of Haar wavelet signal vector 353 are y1, y2, y3, y4, y5, y6, y7, and y8. The example illustrated in FIG. 3 shows that component y1 has a value of 7, as indicated at 354-1, and that component y8 has a value of 0, as indicated at 354-8, among other entries. The components of Haar wavelet signal vector are generally computed as follows:

Level 0

$$y1 = x1 + x2 + x3 + x4 + x5 + x6 + x7 + x8$$

Level 1

$$y2 = (x1 + x2 + x3 + x4) - (x5 + x6 + x7 + x8)$$

Level 2

$$y3 = (x1 + x2) - (x3 + x4)$$

$$y4 = (x5 + x6) - (x7 + x8)$$

Level 3

$$y5 = x1 - x2$$

$$y6 = x3 - x4$$

$$y7 = x5 - x6$$

$$y8 = x7 - x8$$

The discrete wavelet transform can be performed by determining how much of every possible scaled and shifted version of the reference wavelet (e.g., Haar wavelet) is present within the path signal. This can be determined by finding the dot product of the path signal vector and the Haar wavelet transform matrix.

Continuing with the previous example, the Haar transform is used to provide the different levels of resolution of a path signal. Using the path signal f$_{p,t}$=[2 0 2 1 1 1 0 0] and using the Haar wavelet transform matrix (for 8 components):

$$H = \begin{bmatrix} \sqrt{\frac{1}{8}} & \sqrt{\frac{1}{8}} & \sqrt{\frac{1}{8}} & \sqrt{\frac{1}{8}} & \sqrt{\frac{1}{8}} & \sqrt{\frac{1}{8}} & \sqrt{\frac{1}{8}} & \sqrt{\frac{1}{8}} \\ \sqrt{\frac{1}{8}} & \sqrt{\frac{1}{8}} & \sqrt{\frac{1}{8}} & \sqrt{\frac{1}{8}} & -\sqrt{\frac{1}{8}} & -\sqrt{\frac{1}{8}} & -\sqrt{\frac{1}{8}} & -\sqrt{\frac{1}{8}} \\ \sqrt{\frac{1}{4}} & \sqrt{\frac{1}{4}} & -\sqrt{\frac{1}{4}} & -\sqrt{\frac{1}{4}} & 0 & 0 & 0 & 0 \\ 0 & 0 & 0 & 0 & \sqrt{\frac{1}{4}} & \sqrt{\frac{1}{4}} & -\sqrt{\frac{1}{4}} & -\sqrt{\frac{1}{4}} \\ \sqrt{\frac{1}{2}} & -\sqrt{\frac{1}{2}} & 0 & 0 & 0 & 0 & 0 & 0 \\ 0 & 0 & \sqrt{\frac{1}{2}} & -\sqrt{\frac{1}{2}} & 0 & 0 & 0 & 0 \\ 0 & 0 & 0 & 0 & \sqrt{\frac{1}{2}} & -\sqrt{\frac{1}{2}} & 0 & 0 \\ 0 & 0 & 0 & 0 & 0 & 0 & \sqrt{\frac{1}{2}} & -\sqrt{\frac{1}{2}} \end{bmatrix}$$

the Haar wavelets signal vector is $$Hf'_{p,t} = \begin{bmatrix} \dfrac{7}{\sqrt{8}} & \dfrac{3}{\sqrt{8}} & -\dfrac{1}{\sqrt{4}} & \dfrac{2}{\sqrt{4}} & \dfrac{2}{\sqrt{2}} & \dfrac{1}{\sqrt{2}} & 0 & 0 \end{bmatrix}.$$

The Haar wavelets signal vector for this example looks similar to the original path sequence vector, but its interpretation is quite different. This Haar wavelets signal vector shows the positions of the terms at many resolutions. The various resolutions are summarized in Table 1.

TABLE 1

| Transformed value | Description |
|---|---|
| $7/\sqrt{8}$ | Sum of signal |
| $3/\sqrt{8}$ | First half - Second half of the signal |
| $-1/\sqrt{4}$ | First quarter - Second quarter of the signal |
| $2/\sqrt{4}$ | Third quarter - fourth quarter of the signal |
| $2/\sqrt{2}$ | First eighth - second eighth of the signal |
| $1/\sqrt{2}$ | Third eighth - fourth eighth of the signal |
| 0 | Fifth eighth - sixth eighth of the signal |
| 0 | Seventh eighth - eighth eighth of the signal |

The transformed values towards the top of Table 1 are of lower resolution and the transformed values towards the bottom of Table 1 are of higher resolution.

The first transformed value ($7/\sqrt{8}$) is a sum of total signal and indicates that there are seven occurrences of the path. The second transformed value ($3/\sqrt{8}$) means that there is three more occurrences of the path in the first half of the signal than in the second half. The third value ($-1/\sqrt{4}$) shows that there is one less occurrence of the path in the first quarter compared to the second quarter. The fourth value ($2/\sqrt{4}$) compares the third quarter and the fourth quarters of the original path signal. The next four transformed values correspond to the comparison between the four pairs of eighths of the signal. Therefore, the original path signal can be observed in different levels of resolution. This implies that frequency information is calculated from parts of the tree, providing frequency and position information. The above procedure can be repeated to convert all unique paths of the trees being compared into the Haar wavelets signals.

The benefits of performing the Haar wavelet transform include the spectral domain magnitude and phase values being related to the spatial path count and position, respectively. Also, the components of a path signal are orthogonal to each other, therefore it is not necessary to cross compare components within the path signal.

FIG. 3 further shows the Haar wavelets signal vector (e.g., vector component values) being used as an entry in a row 355 of a path-page matrix according to an example of the present disclosure to summarize the characteristics of each unique path sequence 360 (e.g., Path$_1$, Path$_2$, . . . , Path$_m$) of a particular web page 358 (e.g., web page X). For example, the above-determined discrete wavelet signal vector (e.g., Haar wavelet signal vector) can comprise path-page matrix entry 356-1 corresponding to Path$_1$ of Page$_x$. Other wavelet signal vectors (e.g., Haar wavelet signal vector) can comprise corresponding path-page matrix entries, through entry 356-$m$ corresponding to Path$_m$ of Page$_x$. In this manner, position information can be established at different resolutions.

According to various examples, fewer than all paths can be selected or further analysis (e.g., discrete wavelet transformation). Depending on the situation, one or more paths of interest, rather than all paths, can be used in arriving at the similarity decision between DOM trees. Paths of interest can be identified, for example, according to a path weighting scheme.

The matrix multiplication can cause the discrete wavelet transformation to be of order $O(N^2)$ for signals of N components. According to some examples of the present disclosure, the wavelet transform can be reduced to an order of $O(N)$ so as to speed up the transform process, such as by using a method proposed by Mallet in 2001.

The analyzer 216, shown in FIG. 2, can function to compute distance on multi level resolutions, which computes the distance values for every common path of two DOM trees, and then sums the distance values for the respective DOM trees as a cumulative (e.g., final) DOM tree distance. The final DOM tree distances can be compared as a basis for determining similarity between the corresponding two web pages.

According to some examples of the present disclosure, the $B^{th}$ component part of each path can be chosen for comparison between web pages. That is, component B of each path of two DOM trees can be compared as a basis for determining similarity of the corresponding documents. This method can reduce the entire DOM tree comparison to a particular portion comparison. According to other examples of the present disclosure, different components in different paths can be chosen to compare, which can be a form of proximity measure.

According to various examples of the present disclosure, two signals can be compared for similarity by checking from the top down (e.g., initiating the comparison from the root node towards a leaf node). If the signals differ at a certain level, the analysis can be terminated with the conclusion of the signals not being similar with no further analysis being necessary The solution of the present disclosure can be a generalization of vector space model when B equals 1. That is, the methodology of the present disclosure behaves in the same manner as the vector space model when B equals 1. In practice, some experiments have been conducted on several small data sets on YAHOO!® (internet) news pages and AMAZON® (internet store) pages. The results show that the method of the present disclosure can determine the tree similarity with high precision. A typical two tree similarity decision time for the conducted experiments performed is 0.417 s for an exact tree matching algorithm, 0.031 s for vector space method and 0.047 s for the example method of the present disclosure using eight components. Reducing the number of components can reduce the running time in a linear fashion.

Using wavelets for document similarity determinations can provide a new perspective by extracting the positions at different resolutions. The benefits of performing the Haar wavelet transform can include:

(1) the spectral domain magnitude and phase values are related to the spatial path count and position, respectively; and (2) the components of a path signal are orthogonal to each other, therefore it is not necessary to cross compare components within the path signal. Furthermore, if a DOM tree is converted into another format sequence instead of a path sequence, the systems and methods of the present disclosure can work as well.

Figure 4:
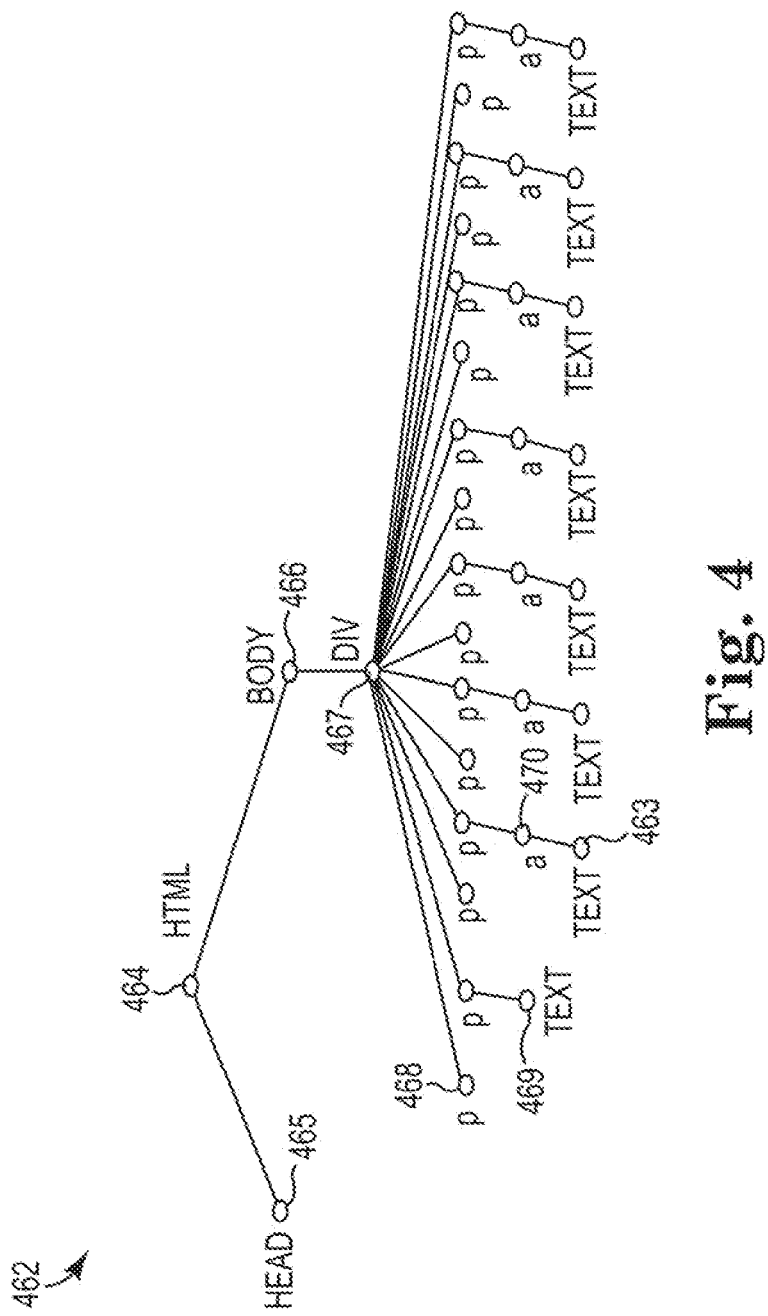
FIG. 4 illustrates an example DOM tree analyzed in accordance with one or more examples of the present disclosure.

FIG. 4 illustrates an example DOM tree analyzed in accordance with one or more examples of the present disclosure. A specific example can further illustrate the method for determining document structure similarity using discrete wavelet transformation of the present disclosure. An example web page may contain the following information:

YAHOO!® Worlds
  YAHOO!® Business
  YAHOO!® Entertainment
  YAHOO!® Sports
  YAHOO!® Tech
  YAHOO!® Politics
  YAHOO!® Science The example web page content shown above can each be a link to other web pages. The HTML file behind the web page content shown above is shown on the following page:

```
<html>
  <head> </head>
  <body>
    <div>
      <p></p>
      <p>An html example</p>
      <p></p>
      <p><a href="http://news.yahoo.com/world/">Yahoo worlds</a></p>
      <p></p>
      <p><a href="http://news.yahoo.com/business/">Yahoo
```

-continued

```
      Business</a>|</p>
      <p></p>
      <p><a href="http://news.yahoo.com/entertainment/">Yahoo
      Entertainment</a></p>
      <p></p>
      <p><a href="http://news.yahoo.com/sports/">Yahoo
      Sports</a></p>
      <p></p>
      <p><a href="http://news.yahoo.com/tech">Yahoo Tech</a></p>
      <p></p>
      <p><a href="http://news.yahoo.com/politics">Yahoo
      Politics</a></p>
      <p></p>
      <p><a href="http://news.yahoo.com/science">Yahoo
      Science</a></span></p>
    </div>
  </body>
</html>
```

The DOM tree 462 for the HTML file shown on the previous page is illustrated in FIG. 4. DOM tree 462 includes a root (HTML) node 464 connected to each of a heading node 465 and a body node 466. The body node 466 is further connected to a division node 467, which is connected in parallel to a number of "p" nodes 468, some of which are connected to text nodes 469 directly, or through an "a" node 470, and as arranged as shown in FIG. 4. The path sequence of DOM tree 462 is:

```
{ /html/head, /html/body/div/p, /html/body/div/p/text/,
/html/body/div/p, /html/body/div/a/text,
/html/body/div/p, /html/body/div/a/text,
/html/body/div/p, /html/body/div/a/text,
/html/body/div/p, /html/body/div/a/text,
/html/body/div/p, /html/body/div/a/text,
/html/body/div/p, /html/body/div/a/text,
/html/body/div/p, /html/body/div/a/text,
/html/body/div/p, /html/body/div/a/text }
```

There are four distinct paths in the path sequence (above), as follows:

```
Path1: /html/head
Path2: /html/body/div/p
Path3: /html/body/div/p/text
Path4: /html/body/div/a/text
```

The above-listed path sequence can be split into eight (8) components, as follows:

```
1: /html/head, /html/body/div/p, /html/body/div/p/text/,
2: /html/body/div/p, /html/body/div/a/text,
3: /html/body/div/p, /html/body/div/a/text,
4: /html/body/div/p, /html/body/div/a/text,
5: /html/body/div/p, /html/body/div/a/text,
6: /html/body/div/p, /html/body/div/a/text,
7: /html/body/div/p, /html/body/div/a/text,
8: /html/body/div/p, /html/body/div/a/text,
```

Because the sequence can't be divided equally, there are three paths in first component and two paths in the rest of the components.

The occurrence of each path in each of the eight components can be counted, and summarized in vector format as follows:

Path1: {1, 0, 0, 0, 0, 0, 0, 0};
Path2: {1, 1, 1, 1, 1, 1, 1, 1};
Path3: {1, 0, 0, 0, 0, 0, 0, 0};
Path4: {0, 1, 1, 1, 1, 1, 1, 1};

That is, each element of a path vector represents how many times that path appears in the corresponding component. For example, Path1 (i.e., /html/head) occurs in the first component one time. A Haar wavelet transform can be performed on these vectors, and distances computed, as previously discussed above.

Figure 5:
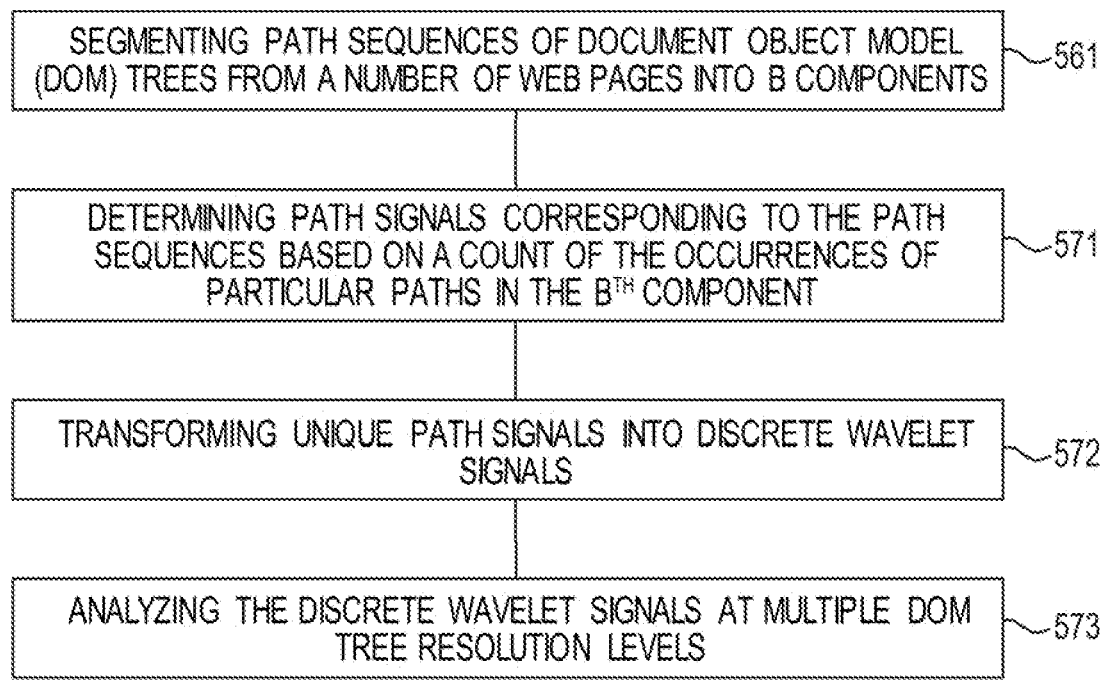
FIG. 5 illustrates a flow diagram of a method for determining document structure similarity using discrete wavelet transformation in accordance with one or more examples of the present disclosure.

FIG. 5 illustrates a flow diagram of a method for discrete wavelet transformation for document structure similarity in accordance with one or more examples of the present disclosure. One example method for determining document structure similarity according to an example of the present disclosure can include segmenting path sequences of document object model (DOM) trees from a number of web pages into B components, as shown at 561. Path signals corresponding to the path sequences are determined based on a count of the occurrences of particular path sequences in the $B^{th}$ component, as indicated at 571. As shown at 572, unique path signals are transformed into discrete wavelet signals. The discrete wavelet signals are analyzed at multiple DOM tree resolution levels, as shown at 573.

FIG. 6 illustrates a block diagram of an example computing system used to implement visual media searching according to the present disclosure. The computing system 674 can be comprised of a number of computing resources communicatively coupled to the network 678. FIG. 4 shows a first computing device 675 that may also have an associated data source 676, and may have one or more input/output devices (e.g., keyboard, electronic display). A second computing device 679 is also shown in FIG. 4 being communicatively coupled to the network 678, such that executable instructions may be communicated through the network between the first and second computing devices.

Second computing device 679 may include one or more processors 680 communicatively coupled to a non-transitory computer-readable medium 681. The non-transitory computer-readable medium 681 may be structured to store executable instructions 682 (e.g., one or more programs) that can be executed by the one or more processors 680 and/or data. The second computing device 679 may be further communicatively coupled to a production device 683 (e.g., electronic display, printer, etc.). Second computing device 679 can also be communicatively coupled to an external computer-readable memory 684. The second computing device 679 can cause an output to the production device 683, for example, as a result of executing instructions of one or more programs stored on non-transitory computer-readable medium 681, by the at least one processor 680, to implement a system for retrieving visual media according to the present disclosure. Causing an output can include, but is not limited to, displaying text and images to an electronic display and/or printing text and images to a tangible medium (e.g., paper). Executable instructions to implement visual media retrieving may be executed by the first computing device 675 and/or second computing device 679, stored in a database such as may be maintained in external computer-readable memory 684, output to production device 683, and/or printed to a tangible medium.

One or more additional computers 677 may also be communicatively coupled to the network 678 via a communication link that includes a wired and/or wireless portion. The computing system can be comprised of additional multiple interconnected computing devices, such as server devices and/or clients. Each computing device can include control circuitry such as a processor, a state machine, application specific integrated circuit (ASIC), controller, and/or similar machine, The control circuitry can have a structure that provides a given functionality, and/or execute computer-readable instructions that are stored on a non-transitory computer-readable medium (e.g., 676, 681, 684). The non-transitory computer-readable medium can be integral (e.g., 681), or communicatively coupled (e.g., 676, 684) to the respective computing device (e.g. 675, 679) in either a wired or wireless manner. For example, the non-transitory, computer-readable medium can be an internal memory, a portable memory, a portable disk, or a memory located internal to another computing resource (e.g., enabling the computer-readable instructions to be downloaded over the Internet). The non-transitory computer-readable medium 330 can have computer-readable instructions stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium can include optical discs, digital video discs (DVD), Blu-ray discs, compact discs (CD), laser discs, and magnetic media such as tape drives, floppy discs, and hard drives, solid state media such as flash memory, EEPROM, phase change random access memory (PCRAM), as well as other types of machine-readable media.

Logic can be used to implement the method(s) of the present disclosure, in whole or part. Logic can be implemented using appropriately configured hardware and/or machine readable instructions (including software). The above-mentioned logic portions may be discretely implemented and/or implemented in a common arrangement.

Figure 7:
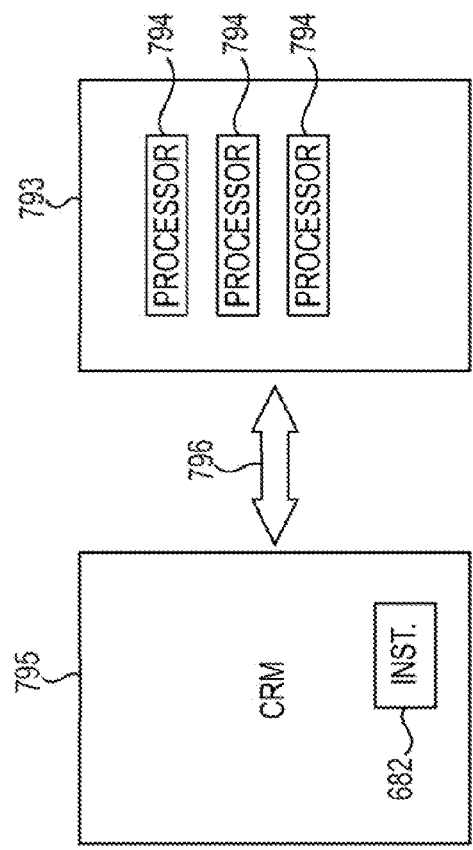
FIG. 7 illustrates a block diagram of an example computer readable medium (CRM) in communication with processing resources in accordance with one or more examples of the present disclosure.

FIG. 7 illustrates a block diagram of an example computer readable medium (CRM) 795 in communication, e.g., via a communication path 796, with processing resources 793 according to the present disclosure. As used herein, processor resources 793 can include one or a plurality of processors 794 such as in a parallel processing arrangement. A computing device having processor resources can be in communication with, and/or receive a tangible non-transitory computer readable medium 795 storing a set of computer readable instructions 732 (including software) for capturing and/or replaying network traffic, as described herein.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples provided herein. The above description has been made in an illustrative fashion, and not a restrictive one. Combination of the above examples, and other examples not specifically described herein will be apparent upon reviewing the above description. Therefore, the scope of one or more examples of the present disclosure should be determined based on the appended claims, along with the full range of equivalents that are entitled.

Throughout the specification and claims, the meanings identified below do not necessarily limit the terms, but merely provide illustrative examples for the terms. The meaning of "a," "an," and "the" includes plural reference, and the meaning of in includes "in" and "on." "Example," as used herein, does not necessarily refer to the same example, although it may.

In the foregoing discussion of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of this disclosure.

Some features are grouped together in a single example for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed example. The following claims are hereby incorporated into the Detailed Description, with each claim standing on its own.

What is claimed:

1. A method for determining document structure similarity, comprising:
    segmenting, by a computing device, path sequences of Document Object Model (DOM) trees from a number of web pages into B components;
    determining path signals corresponding to the path sequences based on a count of the occurrences of particular paths in the $B^{th}$ component, wherein determining path signals comprises weighting the path signals based on path sequence characteristics of a DOM tree;
    transforming unique path signals into discrete wavelet signals;
    analyzing the discrete wavelet signals at multiple DOM tree resolution level, wherein analyzing the discrete wavelet signals comprises:
        computing a distance value for every common signal path of two DOM trees; and
        summing the distance values as a final tree distance for each of the two DOM trees; and
    outputting a document structure similarity decision based on the analyses of the discrete wavelet signals.

2. The method of claim 1, wherein transforming unique path signals further comprises transforming unique path signals into Haar wavelet signals.

3. The method of claim 2, wherein segmenting path sequences further comprises:
    parsing HyperText Markup Language (HTML) of the number of web pages into DOM trees;
    converting the DOM trees of the number of web pages into path sequences that originate at a root node; and
    converting the path sequences into numbers with a hashing function.

4. The method of claim 1, wherein transforming unique path signals into Haar wavelet signals further comprises transforming less than all unique path signals of two DOM trees being compared based on weight of the path signals.

5. The method of claim 1, wherein transforming unique path signals into discrete wavelet signals further comprises transforming all unique path signals of two DOM trees being compared.

6. The method of claim 1, wherein analyzing the discrete wavelet signals further comprises calculating frequency information from one or more parts of the DOM trees.

7. The method of claim 1, wherein analyzing the discrete wavelet signals further comprises:
    computing distance values on multiple levels of resolution; and
    comparing the distance values as a measure of similarity.

8. The method of claim 1, wherein analyzing the discrete wavelet signals further comprises computing a distance value for a $B^{th}$ component the discrete wavelet signals of each signal path of two DOM trees.

9. The method of claim 1, wherein analyzing the discrete wavelet signals further comprises comparing different components in the discrete wavelet signals of different signal paths as a proximity measure.

10. The method of claim 1, wherein analyzing the discrete wavelet signals further comprises comparing Haar wavelet signals of path signals from a root node until the Haar wavelet signals differ.

11. The method of claim 1, wherein transforming unique path signals into discrete wavelet signals further comprises reducing a Haar wavelet transform to order O(N) from order O(N2).

12. A non-transitory computer-readable medium having computer-executable instructions stored thereon, the computer-executable instructions comprising instructions that, when executed by one or more processors, cause the one or more processors to:
    segment path sequences of Document Object Model (DOM) trees of two web pages into a number of equal components;
    determine path signals corresponding to the path sequences based on a count of the occurrences of particular paths in at least one component, wherein determining path signals comprises weighting the path signals based on path sequence characteristics of a DOM tree;
    transform unique path signals into Haar wavelet signals;
    compare the Haar wavelet signals for similarity at multiple DOM tree resolution levels, wherein comparing the Haar wavelet signals comprises:
        computing a distance value for every common signal path of two DOM trees; and
        summing the distance values as a final tree distance for each of the two DOM trees; and
    output a page similarity decision based on the comparison of the Haar wavelet signals.

13. The non-transitory computer-readable medium of claim 12, further comprising instructions to:
    compute a cumulative distance value for every common signal path of the DOM trees; and
    compare a difference between the cumulative distances against a threshold value as a measure of web page similarity.

14. A computing system coupled to a non-transitory computer readable medium having computer-executable instructions stored thereon to determine document structure similarity when executed by one or more processors, the instructions comprising:

an HTML parser to parse Document Object Model (DOM) trees from a number of web pages into path sequences;
a path sequence segmentation module to segment the path sequences into B components and determine path signals corresponding to the path sequences based on a count of the occurrences of particular paths in the $B^{th}$ component, wherein determining path signals comprises weighting the path signals based on path sequence characteristics of a DOM tree;
a Harr wavelet transformation module transforming unique path signals into discrete wavelet signals; and
an analyzer to:
  compute a distance value of the discrete wavelet signals at multiple DOM tree resolution levels for every common signal path of the multiple DOM trees;
  sum the distance values as a final tree distance for each of the multiple DOM trees; and
  output a document structure similarity decision based on the discrete wavelet signals.

* * * * *